(12) United States Patent
Taniike (10) Patent No.: US 10,845,653 B2
(45) Date of Patent: Nov. 24, 2020

(54) METHOD OF PRODUCING LIQUID CRYSTAL DISPLAY PANELS

(71) Applicant: SHARP KABUSHIKI KAISHA, Sakai (JP)

(72) Inventor: Kohshiroh Taniike, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/537,007

(22) Filed: Aug. 9, 2019

(65) Prior Publication Data

US 2020/0057328 A1 Feb. 20, 2020

Related U.S. Application Data

(60) Provisional application No. 62/719,790, filed on Aug. 20, 2018.

(51) Int. Cl.
| | | |
|---|---|---|
| *G02F 1/1341* | (2006.01) | |
| *G02F 1/1333* | (2006.01) | |
| *G02F 1/1339* | (2006.01) | |
| *G02F 1/1368* | (2006.01) | |
| *G02F 1/1335* | (2006.01) | |

(52) U.S. Cl.
CPC ........ *G02F 1/1341* (2013.01); *G02F 1/13394* (2013.01); *G02F 1/133351* (2013.01); *G02F 1/1368* (2013.01); *G02F 1/133514* (2013.01); *G02F 2001/13415* (2013.01)

(58) Field of Classification Search
CPC .............. G02F 1/1341; G02F 1/13394; G02F 1/133351; G02F 1/133514; G02F 2001/13415; G02F 1/1368
See application file for complete search history.

(56) References Cited

U.S. PATENT DOCUMENTS

| | | |
|---|---|---|
| 5,898,041 A | 4/1999 | Yamada et al. |
| 6,001,203 A | 12/1999 | Yamada et al. |
| 6,013,339 A | 1/2000 | Yamada et al. |

(Continued)

FOREIGN PATENT DOCUMENTS

| | | |
|---|---|---|
| JP | H05-134232 A | 5/1993 |
| JP | H08-234213 A | 9/1996 |

(Continued)

*Primary Examiner* — Donald L Raleigh
(74) *Attorney, Agent, or Firm* — ScienBiziP, P.C.

(57) ABSTRACT

A method of producing liquid crystal display panels includes a sealing material application step of applying sealing material on a first substrate to define regions, a vacuum assembling step of assembling a second substrate to the first substrate in a vacuum, an atmospheric pressure pressing step of pressing the first substrate and the second substrate under atmospheric pressure, an ultraviolet curing step of irradiating ultraviolet rays to the sealing material, a thermal curing step of heating the sealing material, a cutting step of cutting the assembled first and second substrates into pieces for each of the regions that are defined by the sealing material and forming pairs of substrates each of which including the region surrounded by the sealing material, and a liquid crystal injecting step of injecting liquid crystals. In the sealing material application step, the sealing material that defines the regions is applied in a closed loop form.

4 Claims, 6 Drawing Sheets

(56) References Cited

U.S. PATENT DOCUMENTS

2006/0164590 A1\* 7/2006 Liu ................... G02F 1/1309
 349/190
2012/0242945 A1\* 9/2012 Yamamoto ........... G02F 1/1339
 349/153

FOREIGN PATENT DOCUMENTS

| JP | 3776614 B2 | 5/2006 | |
| JP | 2006-317669 A | 11/2006 | |
| JP | 2006317669 A \* | 11/2006 | ........... G02F 1/1339 |

\* cited by examiner

METHOD OF PRODUCING LIQUID CRYSTAL DISPLAY PANELS

CROSS REFERENCE TO RELATED APPLICATION

This application claims priority from U.S. Provisional Patent Application No. 62/719,790 filed on Aug. 20, 2013. The entire contents of the priority application are incorporated herein by reference.

TECHNICAL FIELD

The technology described herein relates to a method of producing liquid crystal display panels.

BACKGROUND ART

The vacuum injection method and the one drop filling (ODF) method have been generally known as the methods of producing a liquid crystal display panel. For example, in the vacuum injection method, one of a pair of substrates on which thermosetting sealing material is applied in a frame shape is assembled to another one of the substrates while having a certain space therebetween. Then, the assembled substrates are thermally pressed to cure the sealing material and an empty cell having a space therein is produced. The empty cell is evacuated through an opening for injection, which is previously formed, and the liquid crystals are injected by the capillary action, and then the opening for injection is sealed.

However, with the vacuum injection method, according to tho increase of tho panel size, it takes long time to evacuate the empty cell after the assembling and also time for filling the empty cell with the liquid crystals becomes longer. Therefore, the productivity is lowered particularly in a model including a large-size panel such as a television device. The thermosetting resin that is used as the sealing material has deficiencies as follows. The thermosetting resin has high modulus of elasticity and is less likely to follow expansion and contraction of the cell. Specifically, the sealing material includes epoxy resin as a main component and has a rigid physical property. Therefore, there is a concern about the blowout of the liquid crystal components when the thermal shock teat is performed.

On the other hand, in the one drop filling (ODF) method, ultraviolet curable sealing material is applied to one of a pair of substrates in a frame shape and liquid crystals are dropped to an inside of the frame shape. Then, the one substrate is assembled to another one of the substrates in a vacuum and the assembled substrates are pressed under atmospheric pressure. Thereafter, the pressed substrates are irradiated with ultraviolet ray to cure the sealing material. The one drop filling method is superior in the productivity than the vacuum injection method.

However, with the one drop filling method, the sealing material that is not cured is contacted with the liquid crystals. Therefore, the component of the sealing member is impregnated into the liquid crystals and the ion density within the liquid crystal cell is increased, and this may lead to decrease of the holding rate and reliability may be lowered. The ultraviolet curable sealing material has a relatively low glass transition temperature and is relatively low in adhesiveness, moisture permeability, and reliability against a high temperature. Therefore, components of the liquid crystal material may ester a space between the sealing material and the substrate and this lowers surface bonding strength of the sealing material. Accordingly, stains may be caused on the outer periphery of the panel due to moisture ingress from external environment and this may lower the quality. Such problems are important problems to be solved particularly in a small-sized smartphone panel of the transverse electric field type, which has a small frame area and requires high image sticking property and high bonding strength, and an in-vehicle panel of the transverse electric field type, which requires high reliability.

As a new method that is suitable for middle-to-small size models, a hybrid method that is a combination of the above two methods has bean proposed. Specifically, the sealing material that includes an ultraviolet curable component and a thermosetting component is applied to one of the pair of substrates in a frame shape and the one substrate is assembled to another one of the substrates in a vacuum and the assembled substrates are pressed under atmospheric pressure. Thereafter, the sealing material is cured by ultraviolet ray and heat and an empty cell having a space therein is produced. The empty cell is evacuated through an opening for injection, which is previously formed, and the liquid crystals are injected by the capillary action, and then the opening for injection is sealed.

Recently, demands of panels for the middle-to-small size models such as smartphones or in-vehicle panels have been increased. A method of collectively producing liquid crystal display panels by cutting a large substrate is performed. For example, Japanese Unexamined Patent Application Publication No. 2006-317669 describes a following method of producing liquid crystal display panels. A large array substrate has a seal pattern thereon and the seal pattern includes main seals that define each of regions and a perimeter seal that is continuously formed to surround the main seals collectively. The large array substrate and the large counter substrate are assembled in a vacuum environment. An entire area that is surrounded by the perimeter seal is evacuated to create pressure difference between the area and external air. The assembled substrates are pressed under atmospheric pressure and the sealing material is cured. Thereafter, the assembled large substrates are cut into the regions and separated for each of the regions. The liquid crystals are injected into each of the regions through an opening for injection, which is previously formed, by the capillary action.

However, in the above structure, as the number of faces of panel increases and the size of the substrate increases, the perimeter seal may be often cut partially. If the perimeter seal is cut, the vacuum state of the whole large assembled substrates that include each of the regions is lost at once.

SUMMARY

The technology described herein was made in view of the above circumstances and is related to a method of producing liquid crystal display panels that have high quality with high productivity.

A method of producing liquid crystal display panels according to the technology described herein includes a sealing material application step of applying sealing material including both of an ultraviolet curable component and a thermosetting component on a first substrate to define regions, a vacuum assembling step of assembling a second substrate to the first substrate via the sealing material in a vacuum, an atmospheric pressure pressing step of pressing the first substrate and the second substrate that are assembled to each other under atmospheric pressure, an ultraviolet curing step of irradiating ultraviolet rays to the sealing material to perform ultraviolet curing, a thermal curing step of heating the sealing material to perform thermal curing, a cutting step of cutting the first substrate and the second substrate that are assembled to each other into pieces for each of the regions that are defined by the sealing material and forming pairs of substrates each of which including the region that is surrounded by the sealing material, and a liquid crystal injecting step of injecting liquid crystals into a space between each of the pairs of substrates. In the sealing material application step, the sealing material that defines the regions is applied in a closed loop form.

According to the technology described herein, liquid crystal display panels that have high quality are produced with high productivity.

DETAILED DESCRIPTION

First Embodiment

A method of producing liquid crystal display panels 11 of a first embodiment will be described with reference to FIGS. 1 to 4. An upper side in FIG. 1 corresponds to a front side (an upper side) of the liquid crystal panel 11.

Figure 1:
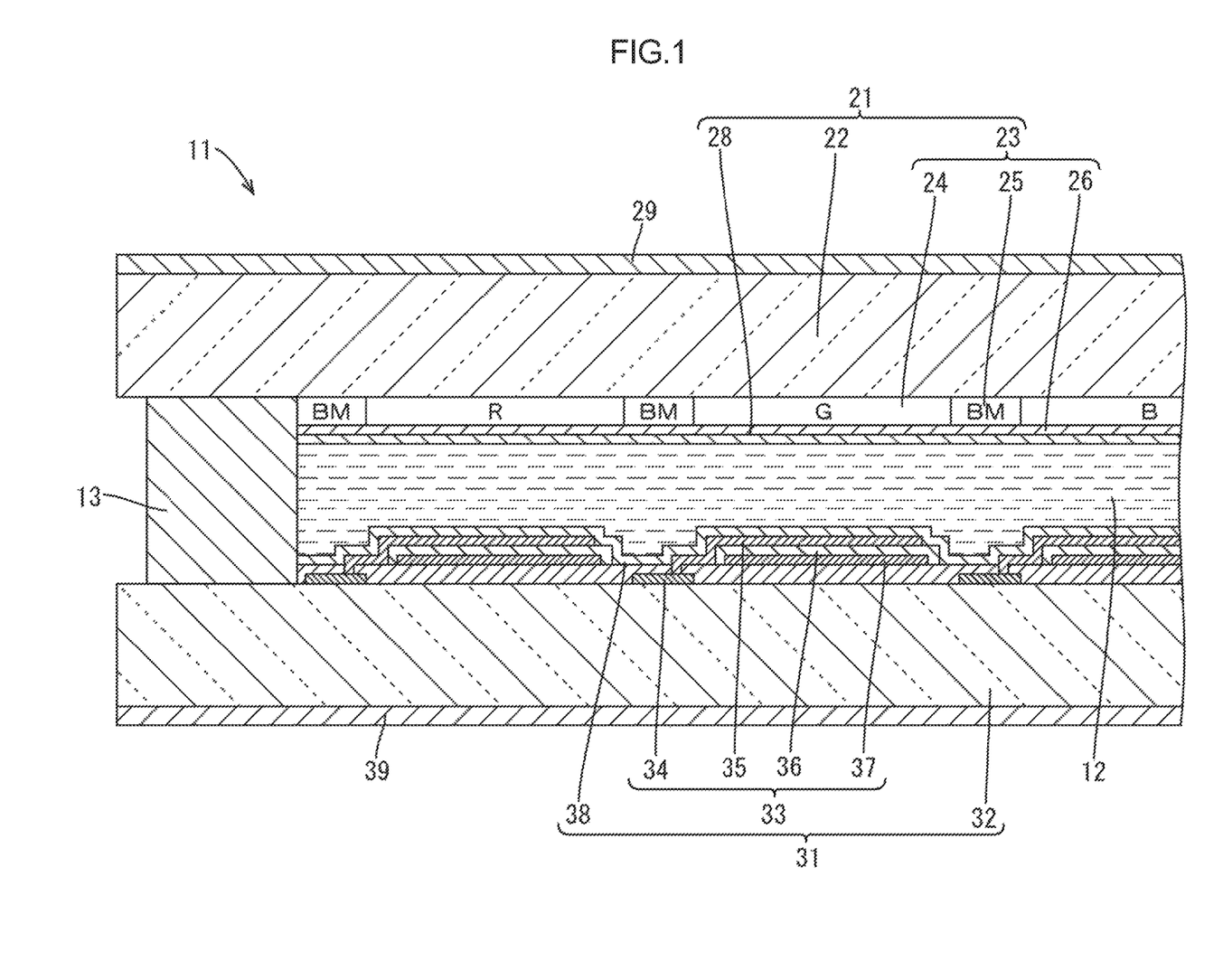
FIG. 1 is an enlarged cross-sectional view illustrating a portion of a liquid crystal display panel according to a first embodiment.

First, the liquid crystal display panel 11 will be described. As illustrated in FIG. 1, the liquid crystal display panel 11 includes a pair of substrates 21, 31, which have high transmissivity, and liquid crystals 12 sandwiched between the substrates 21, 31 including liquid crystal molecules, which are substances whose optical properties are changed by application of an electrical field (orientation of liquid crystal molecules having dielectric constant anisotropy is changed by application of an electrical field). Of the pair of the substrates 21, 31, the front side one is a CF substrate 21 and the back side one is an array substrate 31. Each of the CF substrate 21 and the array substrate 31 is formed by stacking various kinds of films on an inner surface side of a first, glass substrate 22 and a second glass substrate 32, respectively. The CF substrate 21 and the array substrate 31 are assembled by sealing material 13 while keeping a cell gap of a layer thickness of the liquid crystals 12 therebetween. The liquid crystals 12 are surrounded by the sealing material 13. The sealing material 13, which is used in the present embodiment, includes both of an ultraviolet curable component that is cured by ultraviolet rays and a thermosetting component that is cured by heating. Polarizing plates 29, 39 are pasted to outer surfaces of the substrates 21, 31, respectively.

On the array substrate 31, thin film transistors (TFTs) 34, which are switching components, and pixel electrodes 35 are arranged in a matrix and gate lines and source lines are arranged in a grid to surround the TFTs 34 and the pixel electrodes 35. Predetermined image signals are supplied from a control circuit to each of the lines. The pixel electrodes 35 are made of a transparent, electrode such as indium tin oxide (ITO), zinc oxide (ZnO), indium zinc oxide (IZO), or indium gallium zinc oxide (IGZO).

A common electrode 37 that is made of the transparent electrode film similarly to the pixel electrodes 35 is disposed below the pixel electrode 35 while having an insulation layer 36 therebetween. Thus, the pixel electrode 35 and the common electrode 37 are formed on the array substrate 31. If a potential difference is created between the electrodes 35, 37, a fringe electric field including a component in a direction normal to a plate surface of the array substrate 31 is applied to the liquid crystals 12 in addition to a component in a direction along the plate surface of the array substrate 31. The liquid crystal display panel 11 operates in a fringe field switching (FFS) mode that is a mode improved from an in-plane switching (IPS) mode. Furthermore, on the front surface of the array substrate 31, an alignment film 38, which is a polyimide film, for example, is formed to cover the TFTs 34 and the pixel electrodes 35.

The CF substrate 21 includes a color filter 24 so as to be opposite the respective pixel electrodes 35 included in the array substrate 31. The color filter 24 includes color portions in three colors of red (R), green (G), and blue (B) that arranged repeatedly in a matrix. Each of the color portions (each pixel) of the color filter 24 arranged in a matrix is defined by a light blocking section (a black matrix) 25 and the light blocking section 25 prevents color light rays passing through the color portions from being mixed. An overcoat film 26 is disposed on front surfaces (on lower surfaces in FIG. 1) of the color filter 24 and the light blocking section 25. Columnar photo spacers (PS) are arranged on the overcoat film 26 corresponding to the light blocking section 25 at a curtain density and at certain intervals to keep a gap between the array substrate 31 and the overcoat film 26 for holding the liquid crystals 12 therebetween. An alignment film 28 is disposed on a front surface (a lower surface in FIG. 1) of the overcoat film 26. No electrode is included in the CF substrate 21.

The structure of the liquid crystal display panel 11 according to the present embodiment is described before, and in the following section, the structure formed on the first glass substrate 22 except for the alignment film 28 is referred to as a CF layer 23 and the structure formed on the second glass substrate 32 except for the alignment film 38 is referred to as a TFT layer 33.

Next, a method of producing the liquid crystal display panel 11 will be described. In the present embodiment, the liquid crystal display panel 11 is produced by cutting a assembled substrate 15 into multiple pieces. The assembled substrate 15 is obtained by assembling and fixing a non-divided first glass substrate 22 on which the CF layers 23 and the alignment films 28 are formed (non-divided multiple CF substrates 21, hereinafter, referred to as a first substrate 20) and a non-divided second glass substrate 32 on which the TFT layers 33 and the alignment films 38 are formed (non-divided multiple array substrates 31, hereinafter, referred to as a second substrate 30).

First, the non-divided first glass substrate 22 for forming the CF substrates 21 and the non-divided second glass substrate 32 for forming the array substrates 31 are prepared. The CF layers 23 are formed on one plate surface of the first glass substrate 22 and the TFT layers 33 are formed on one plate surface of the second glass substrate 32. The known photolithography method is used to form the CF layers 23 and the TFT layers 33 on the first glass substrate 22 and the second glass substrate 32, respectively. Namely, thin films for forming the CF layers 23 and the TFT layers 33 are layered on each other sequentially in a predetermined pattern on the first glass substrate 22 and the second glass substrate 32 while the first glass substrate 22 and the second glass substrate 32 being transferred through devices such as a film forming device, a resist coating device, and an exposing device. The CF layers 23 and the TFT layers 33 are formed in a matrix (three rows and four columns in this embodiment) on the glass substrates 22, 32, respectively, so as to be opposite each other when the substrates 20, 30 are assembled to each other.

Next, the alignment film 28 is formed to cover the CF layers 23 formed on the first glass substrate 22 and the alignment film 38 is formed to cover the TFT layers 33 formed on the second glass substrate 32. According to the sequence, the first substrate 20 that includes continuous twelve CF substrates 21 is obtained and the second substrate 30 that includes continuous twelve array substrates 31 is obtained.

Figure 2A:
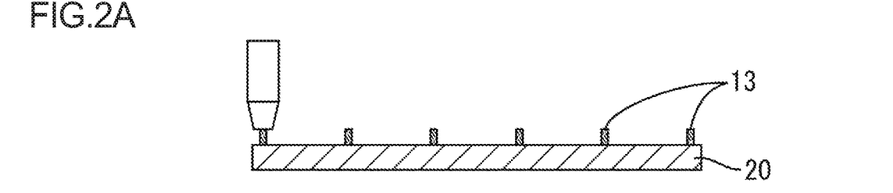
FIG. 2A is a schematic view illustrating a sealing material application step.

Next, the sealing material 13 that includes both of the ultraviolet curable component and the thermosetting component is applied on the first substrate 20 (a sealing material application step, refer FIG. 2A). The sealing material 13 is applied to surround each region of the first substrate 20 that includes the CF layer 23.

Known photo-curable resin is used as the ultraviolet curable component. Examples of the photo-curable resin include (meth)acrylate based photo-curable resin, imide-based photo-curable resin, and silicon-based photo-curable resin. Known thermosetting resin is used as the thermosetting component and examples of the thermosetting resin include epoxy resin and silicon resin.

Figure 3:
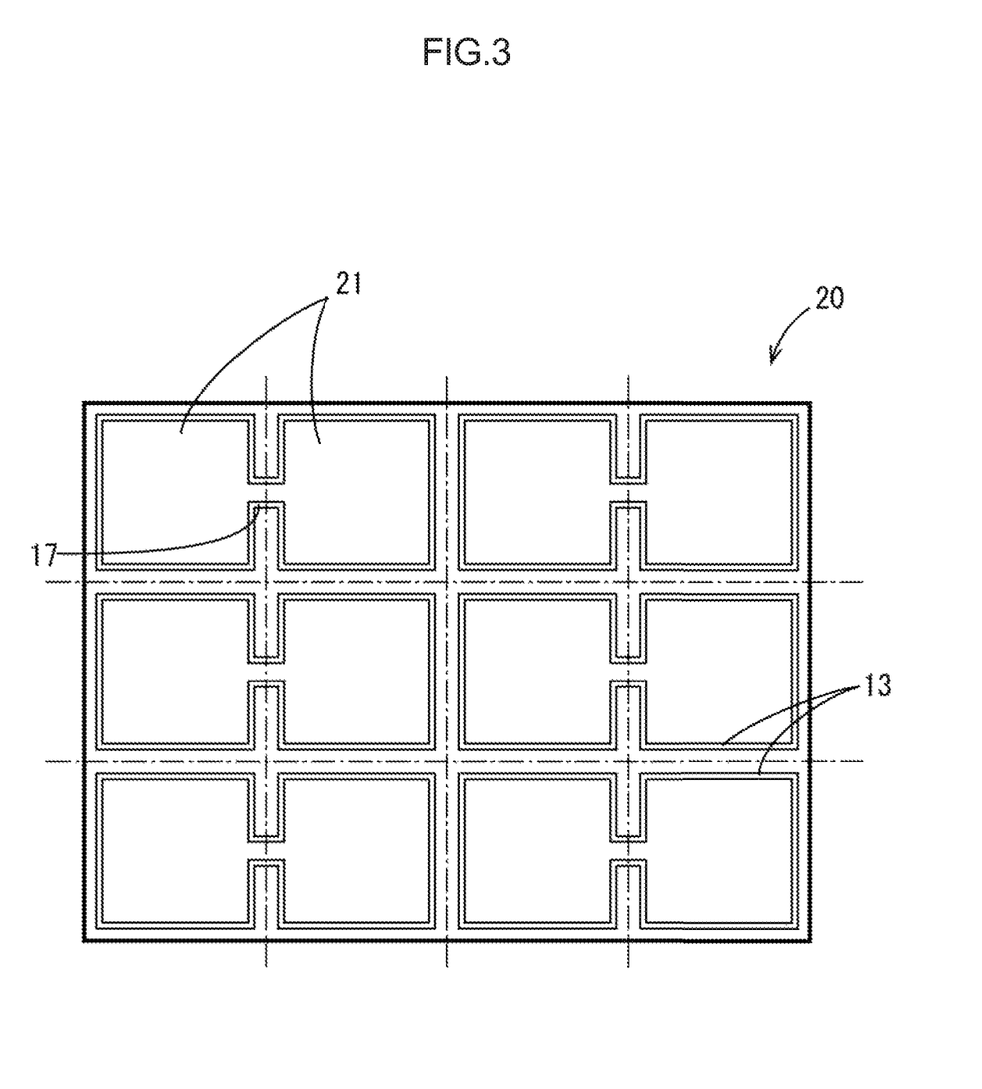
FIG. 3 is a plan view illustrating a first substrate on which the sealing material is applied.

FIG. 3 is a plan view of the first substrate 20 on which the sealing material 13 is applied. The sealing material 13 is applied to surround the region where each CF layer 23 is formed and formed in a quadrangular shape substantially along an outline of each liquid crystal display panel 11. Further, the sealing material 13 is applied in a loop form such that the adjacent CF substrates 21 are connected to each other at portions thereof (a middle portion of one side) via a connection section 17 that has a groove shape. Namely, the sealing material 13 is applied in a closed loop form for every pair of adjacent CF substrates 21.

Figure 2B:
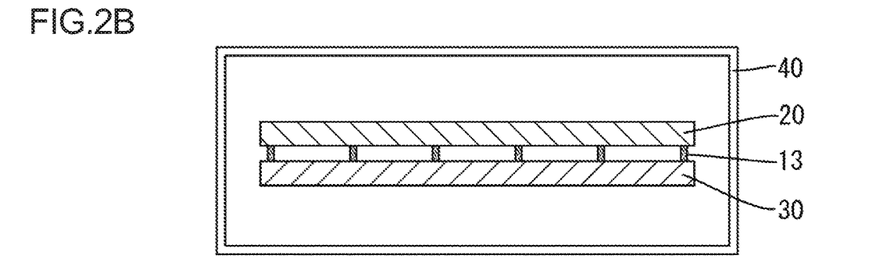
FIG. 2B is a schematic view illustrating a vacuum assembling step.

Next, the first substrate 20 and the second substrate 30 are positioned in a vacuum chamber 40 such that the CF layers 23 correspond to the TFT layers 33, respectively, and are assembled to each other with the sealing material 13 (a vacuum assembling step, refer FIG. 2B). A vacuum state includes a reduced pressure atmosphere that is close to the vacuum state.

Figure 2C:
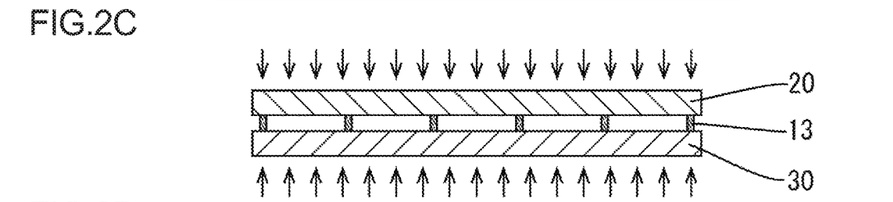
FIG. 2C is a schematic view illustrating an atmospheric pressure pressing step.
Figure 2D:
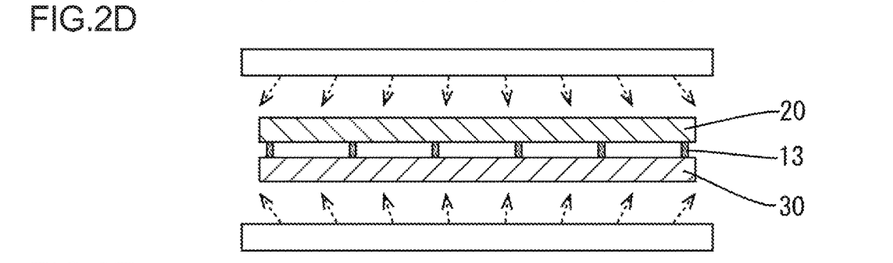
FIG. 2D is a schematic view illustrating an ultraviolet curing step.
Figure 2E:
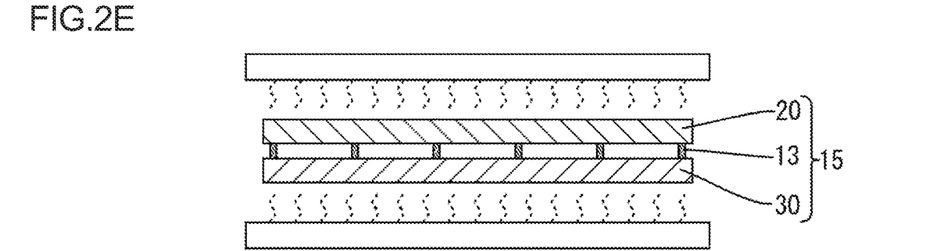
FIG. 2E is a schematic view illustrating a thermal curing step.

Next, the vacuum state is released and the assembled substrates 20, 30 are pressed under atmospheric pressure (an atmospheric pressure pressing step, refer FIG. 2C). The whole substrates 20, 30 are pressed with uniform pressure (atmospheric pressure) by being pressed under atmospheric pressure. In this step, a space between the pair of substrates 20, 30 is kept at a certain distance by the photo spacers that are induced in the CF substrate 21. In this state, the sealing material 13 is irradiated with ultraviolet rays to perform pre-curing (an ultraviolet curing step, refer FIG. 2D) and also heated to perform curing (a thermal curing step, refer FIG. 2E). Accordingly, the sealing material 13 is cured and the assembled substrate 15 is obtained. The assembled substrate 15 includes the substrates 20, 30 that are assembled such that the space therebetween is fixed to be uniform with the sealing material 13. At this time, the region that is between the substrates 20, 30 and surrounded by the sealing material applied in a closed loop form is in a vacuum.

In such an obtained assembled substrate 15, the region that includes a set of the CF layer 23 and the TFT layer 33 that are opposite each other is a panel region from which one liquid crystal display panel 11 is formed. The assembled substrate 15 is defined into twelve panel regions of three rows and four columns (refer FIG. 3). Lines that define imaginary panel regions on the assembled substrate 15 are illustrated with chain dot lines in FIG. 3. Each of the panel regions includes the cured sealing material 13 and a thin film pattern that is disposed within the sealing material 13 and includes the CF layer 23 and the TFT layer 33.

Figure 4:
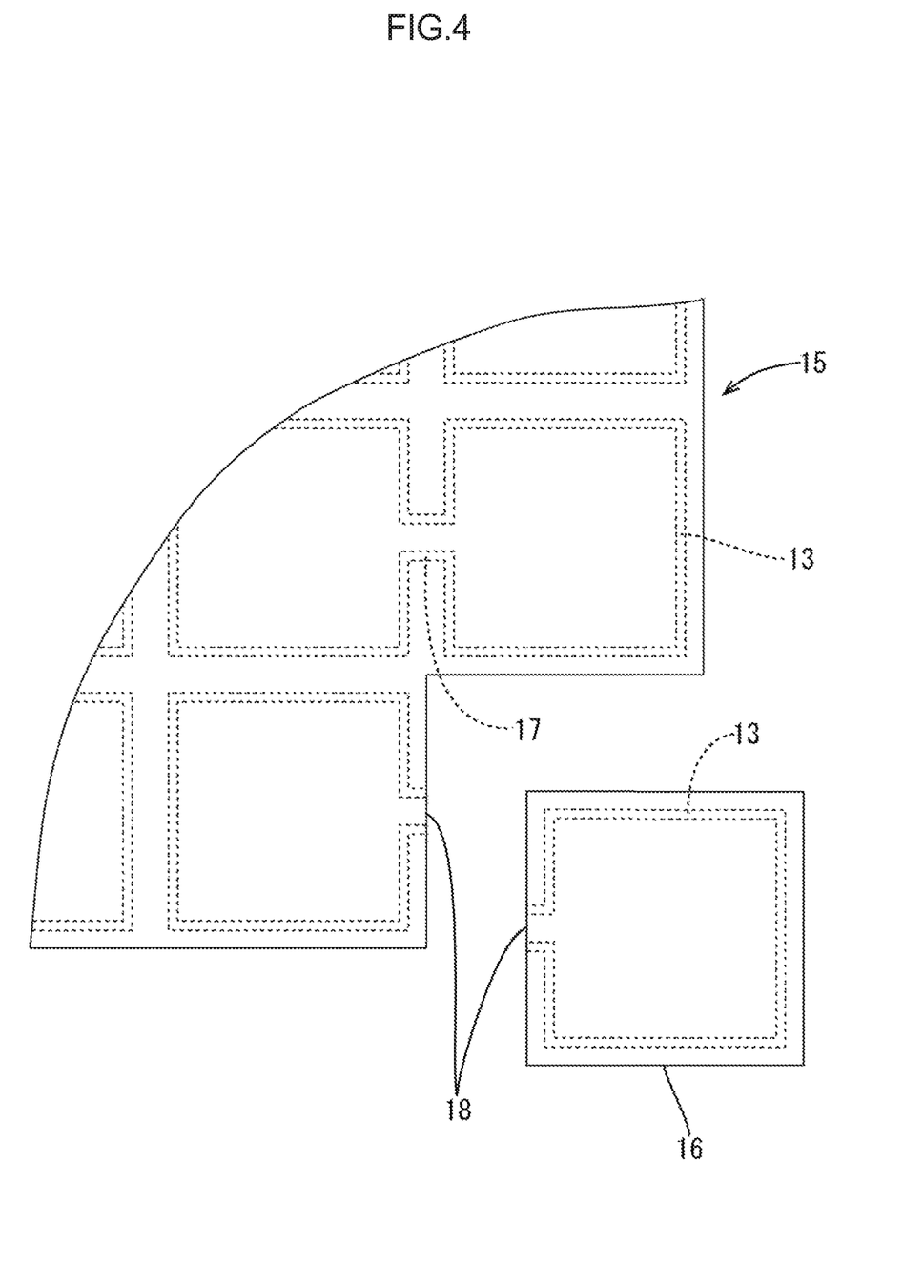
FIG. 4 is a partially enlarged schematic plan view illustrating a cutting step.

Next, the assembled substrate 15 is cut into twelve pieces each of which corresponds to every panel region (a cutting step, refer FIG. 4). Hereinafter, a piece of the assembled substrate 15 after the cutting is referred to as an empty cell 16. Specifically, in the cutting step, the assembled substrate 15 is cut along the sealing material 13 that defines each of the panel regions with a rotary blade. Accordingly, each panel region is obtained and the connection section 17 is cut at a middle portion thereof. Each panel region (the empty cell 16) has an opening 18 that is formed by cutting the connection section 17.

Figure 2F:
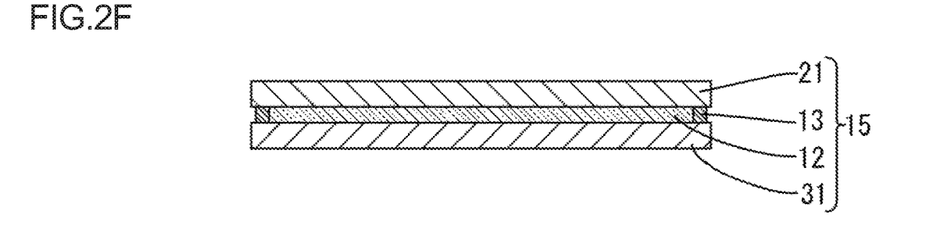
FIG. 2F is a schematic view illustrating a liquid crystal injecting step.

Next, the opening 18 is immersed in a liquid crystal tank where the liquid crystals 12 are stored in the vacuum chamber such that the liquid crystals 12 are suctioned into the empty cell 16 by the capillary action (a liquid crystal injecting step, refer FIG. 2F). After the empty cell 16 is filled with the liquid crystals 12, the opening 18 is filled with sealant that includes both of the ultraviolet curable component and the thermosetting component. The sealant is irradiated with ultraviolet rays to perform pre-curing and subsequently heated to perform curing and the opening 18 is sealed. In FIG. 2F, the liquid crystal display panel 11 is illustrated by u same size as that of the assembled substrate 15 before cutting.

Thereafter, the polarizing plates 29, 39 are pasted to the outer surfaces of the substrates 21, 31, respectively, and twelve liquid crystal display panels 11 of the present embodiment are obtained.

According to the method of producing the liquid crystal display panels 11 of the present embodiment, the sealing material that is used includes both of the ultraviolet curable component and the thermosetting component. Therefore, low adhesiveness, moisture ingress due to high moisture permeability, and low reliability against a high temperature, which may be caused by the ultraviolet curable sealing material, are improved. Also, high modulus of elasticity which may be caused by the thermosetting sealing material is improved. Namely, the liquid crystal display panel 11 with high quality can be obtained.

In the sealing material application step, the sealing material 13 that defines each of the CF substrates 21 is applied in a closed loop form. Therefore, even if a portion of the sealing material 13 is cut during the production process, the panel regions other than the panel region with the cut sealing material 13 are kept in the normal vacuum state in the vacuum assembling step and are pressed under the atmospheric pressure in a normal state. Namely, compared to a conventional structure in which all of the panel regions lose the vacuum state if a portion of the perimeter seal is cut, the yield is greatly improved.

A portion of the sealing material 13, which is formed in the closed loop form in the sealing material application step, is opened in the cutting step and the opening 18 is formed and the liquid crystals 12 are injected through the opening 18. Therefore, another step for forming the opening 18 is not necessary and the operability is improved.

Furthermore, the sealing material 13 is applied in a loop form so as to connect adjacent two CF substrates 21 with the connecting section 17 and the connecting section 17 is cut to form the opening 18 in the cutting step. Therefore, compared to the structure in which the opening 18 is formed for every CF substrate 21, the opening 18 can be formed with a simple structure.

Second Embodiment

Next, a second embodiment will be described with reference to FIG. 5. A method of producing liquid crystal display panels of the present embodiment differs from that of the first embodiment in an applying pattern of sealing material 43 on a first substrate 50. Hereinafter, a configuration that differs from that of the first embodiment will be described and the configurations similar to those of the first embodiment, are described with numerals to each of which thirty is added and will not be described.

Figure 5:
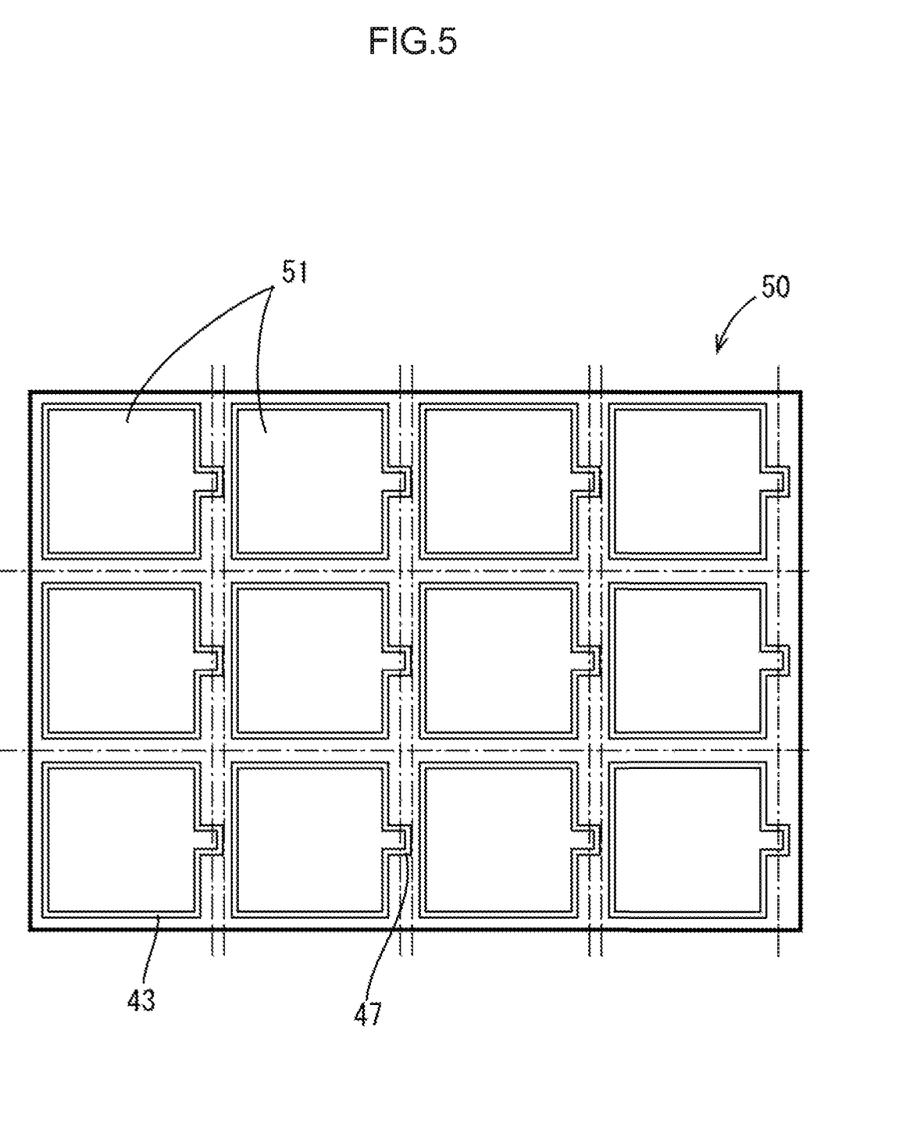
FIG. 5 is a plan view illustrating a first substrate on which sealing material according to a second embodiment is applied.

As illustrated in FIG. 5, the applying pattern of the sealing material 43 according to the present embodiment differs from that of the first embodiment as follows. The applying pattern of the sealing material 43 extends substantially along an outline of each CF substrate 51 and includes a projection 47 on one of four sides thereof instead of the connection section 17 and has a closed loop form.

The sealing material 43 is applied in the closed loop form for each of the panel regions with such an applying pattern. Therefore, even if a portion of the sealing material 43 is cut during the production process, the panel regions other than the panel region with the cut sealing material 43 are kept in the normal vacuum state in the vacuum assembling step.

The sealing material 43 is cut at a portion thereof in the cutting step such that a distal end of the projection 47 is cut to form an opening. Therefore, another step for forming the opening is not necessary and the operability is improved. Further, as illustrated in FIG. 5, second cutting may be performed to remove residual sealing material 43 that remains on an opposite aide from the opening in such a case, unnecessary sealing material 43 is completely removed.

Next, Examples in which the producing method of the first embodiment is performed and Comparative Examples will be described in detail.

EXAMPLE 1

The liquid crystal display panels 11 of Example 1 were produced with the producing method according to the first embodiment. Specifically, the liquid crystal display panels 11 were produced in the following method. The liquid crystal display panels 11 are obtained from the assembled substrate defined into twelve pieces of three rows and four columns and are defined as 10.21 type in-vehicle model and operate in the FSS mode of tho transverse electric field type.

(1) The sealing material 13 that includes both of the ultraviolet curable component and the thermosetting component is applied on tho first substrate 20 on which the CF layers 23 are disposed so as to define each of CF layer 23 formed regions (the CF substrate 21) (the sealing material application step). The sealing material 13 is applied in the closed loop form such that the adjacent pair of CF substrates 21 are connected to each other via the connection section 17 of a groove shape (refer FIG. 3).

(2) The first substrate 20 and the second substrate 30 on which the TFT layers 33 are formed are assembled to each other in a vacuum (the vacuum assembling step).

(3) The first substrate 20 and the second substrate 30 that are assembled are pressed under atmospheric pressure (the atmospheric pressure pressing step).

(4) The sealing material 13 is irradiated with ultraviolet rays to perform ultraviolet curing (pre-curing) (the ultraviolet curing step).

(5) The sealing material 13 is heated to perform thermal curing (curing) (the thermal curing step).

(6) The first substrate 20 and the second substrate 30 that are assembled to each other (the assembled substrate 15) is cut into pieces for every region defined by the sealing material 13 and the empty cells 26 are produced (the cutting step). In this step, the connection section 17 is also cut and the openings 18 are formed.

(7) In the vacuum chamber, the opening 18 is immersed in the liquid crystal tank that stores the liquid crystals 12 and the liquid crystals 12 are injected into the empty cell 16 by the capillary action (the liquid crystal injecting step).

(8) The opening 18 is sealed with sealant.

EXAMPLE 2

The liquid crystal display panels 11 of Example 2 wore produced with the producing method similar to that of Example 1 other than the following points. The sealing material 13 that was used in Example 2 includes both of the ultraviolet curable component and the thermosetting component that are different kind of components from those of the first embodiment.

COMPARATIVE EXAMPLE 1

Liquid crystal display panels of Comparative Example 1 were produced with the vacuum injection method. Specifically, the liquid crystal display panels were produced in the following manner.

(1) Sealing material made of thermosetting epoxy resin is applied on the first substrate on which the CF layers are disposed so as to define each of CF layer formed regions (the CF substrate). The sealing material is applied in the closed loop form that has an opening in a portion thereof for every CF layer.

(2) The first substrate and the second substrate on which the TFT layers are formed are assembled to each other under the atmospheric pressure.

(3) The assembled substrate is pressed while being heated so as to have a predetermined distance between the first substrate and the second substrate.

(4) The sealing material is heated to perform thermal curing.

(5) The assembled substrate is cut into empty cells.

(6) Each of the empty cells is evacuated and the liquid crystals are injected through the opening with the vacuum injection method.

(7) The opening is sealed with sealant.

COMPARATIVE EXAMPLE 2

Liquid crystal display panels of Comparative Example 2 were produced with the one drop filling (ODF) method. Specifically, the liquid crystal display panels were produced in the following manner.
(1) The sealing material that includes both of the ultraviolet curable component and the thermosetting component same as those of Example 1 is applied on the first substrate on which the CF layers are disposed so as to define each of CF layer formed regions (the CF substrate). The sealing material is applied in the closed loop form for every CF layer.
(2) The liquid crystals are dropped in the region that, is defined by the sealing material.
(3) The first substrate and the second substrate on which the TFT layers are formed are assembled to each other in a vacuum.
(4) The first substrate and the second substrate that are assembled are pressed under atmospheric pressure.
(5) The sealing material is irradiated with ultraviolet rays to perform ultraviolet curing (pre-curing).
(6) The sealing material is heated to perform thermal curing (curing).
(7) The first substrate and the second substrate that are assembled to each other (the assembled substrate) are cut into pieces for every region defined by the sealing material and the liquid crystal display panels are produced.

COMPARATIVE EXAMPLE 3

Figure 6:
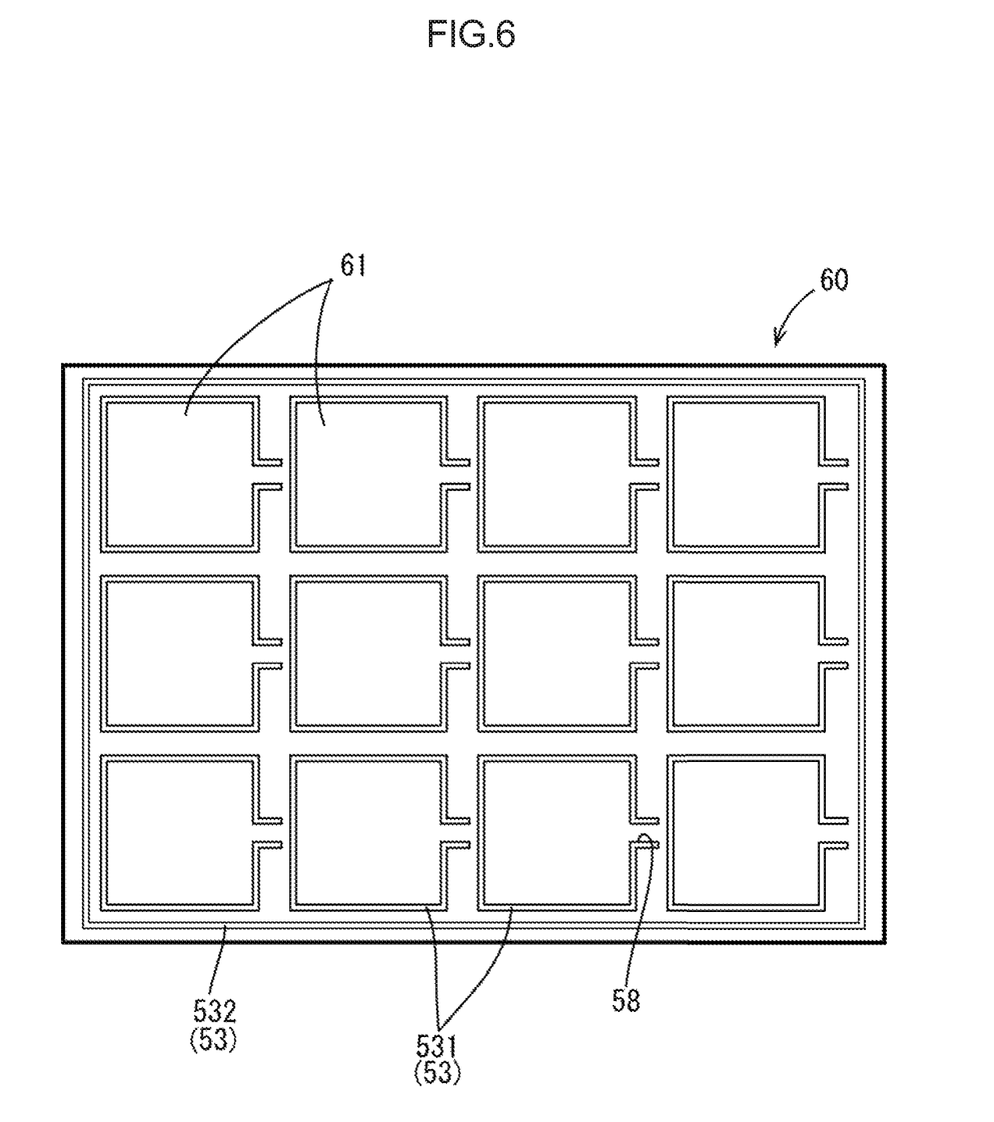
FIG. 6 is a plan view illustrating a first substrate on which sealing material according to Comparative Example 3 is applied.

Liquid crystal display panels according to Comparative Example 3 were produced with the hybrid method that is a combination of the vacuum injection method and the one drop filling method. Specifically, the liquid crystal display panels were produced in the following manner.
(1) Sealing material 53 that includes both of the ultraviolet curable component and the thermosetting component same as those of Example 1 is applied on a first substrate 60 on which the CF layers are disposed so as to define each of CF layer formed regions (CF substrate 61). As illustrated in FIG. 6, the sealing material 53 includes inner seals 531 and an outer seal 532. Each of the inner seals 531 extends substantially along an outline of each CF substrate 61 and includes an opening 58. The outer seal 532 extends along an outer periphery of the first substrate 60 and is formed in a closed loop form so as to surround the inner seals 531.
(2) The first substrate 60 and the second substrate on which the TFT layers are formed are assembled to each other in a vacuum.
(3) The first substrate 60 and the second substrate that are assembled are pressed under atmospheric pressure.
(4) The sealing material 53 is irradiated with ultraviolet rays to perform ultraviolet curing (pre-curing).
(5) The sealing material 53 is heated to perform thermal curing (curing).
(6) The first substrate 60 and the second substrate that are assembled to each other (the bonded substrate) are cut into pieces for every region defined by the inner seals 531 and empty cells are produced.
(7) In the vacuum chamber, an opening 58 is immersed in the liquid crystal tank that stores the liquid crystals and the liquid crystals are injected into the empty cell by the capillary action.
(8) The opening 58 is sealed with sealant.

The yield was checked for each of the liquid crystal display panels that wore produced as described before. The humidity test and the thermal shock test were performed. In the humidity test, each of the five liquid crystal display panels (the number of sample n=5) is put in a test tank of relative humidity of 95% and creation of stains on the outer periphery of each liquid crystal display panel after 1,000 hours has passed was checked with a lighting test. In the thermal shock test, each of the five liquid crystal display panels (the number of sample n=5) is put in a cyclic test tank in which a sample is kept at a temperature of −40° C. for 0.5 hour and at a temperature of 85° C. for 0.5 hour in a repeated manner and after 1,000 hours has passed, each of the liquid crystal display panels was checked by sight for an alignment condition when the liquid crystal display panel is sandwiched between the two polarizing plates orthogonal to each other on a high luminance backlight (about 30,000 cd/m$^2$).

Producing conditions and measurement results of the samples are described in Table 1.

TABLE 1

| | PROCESS FLOW | SEALING MATERIAL | SEAL DRAWING PATTERN | YIELD | HUMIDITY TEST | THERMAL SHOCK TEST |
|---|---|---|---|---|---|---|
| COMPARATIVE EXAMPLE 1 | VACUUM INJECTION METHOD | THERMOSETTING TYPE | — | ○ | ○ | x |
| COMPARATIVE EXAMPLE 2 | ONE DROP FILLING METHOD | UV CURABLE • THERMOSETTING COMBINATION TYPE A | — | ○ | x | ○ |
| COMPARATIVE EXAMPLE 3 | HYBRID METHOD | UV CURABLE • THERMOSETTING COMBINATION TYPE A | INNER SEAL WITH OPENING + OUTER SEAL | x | ○ | ○ |
| EXAMPLE 1 | HYBRID METHOD | UV CURABLE • THERMOSETTING COMBINATION TYPE A | ADJACENT PANELS IN CLOSED LOOP | ○ | ○ | ○ |
| EXAMPLE 2 | HYBRID METHOD | UV CURABLE • THERMOSETTING COMBINATION TYPE B | ADJACENT PANELS IN CLOSED LOOP | ○ | ○ | ○ |

With respect to the yield, the yield is x if a rate of creation of defective panels by the cutting of the sealing material is 5% or more, the yield is ○ if the rate of creation is less than 5% by the cutting of the sealing material. In comparative Example 1, comparative Example 2, Example 1, and Example 2, the rate of creation of defective panels was almost 0% (less than 0.3%) and was good. On the other hand, in Comparative Example 3, there was a case where the outer sealing material was cut and the vacuum state cannot be maintained at the time of the assembling. In some cases, all the target substrates were defective. At the outer peripheral portion of the substrate, the CF substrate includes the overcoat film and the array substrate includes an interlayer insulation layer and an organic insulation layer, and both of the substrates include the alignment film. Thus, the substrate includes edge portions of various stacking films at the outer peripheral portion thereof and the pattern of the films may be wavy. Therefore, the sealing material drawing properties of substrates may not be good. In such a large substrate that includes a plurality of substrates, the outer seal 532 that has a long dimension so as to surround the outer periphery of the large substrate is likely to be cut compared to the inner seal 531 that surrounds each of the substrates. Accordingly, the above-described results were obtained.

In the humidity test, the result is ○ if the number of samples with creation of a stain on the outer periphery among the five samples is zero (no stain in any one of the samples), the result is Δ if the number of samples is one to four, and the result is x if the number of samples is five (stain in all of the samples). As illustrated in Table 1, in Comparative Example 2 in which the one drop filling method is performed, stain was created at high rate of creation. This may be caused because the liquid crystals enter a space between the uncured sealing material and the substrate and surface bonding strength of the sealing material was lowered and moisture enters from outside.

In the thermal shock test, the result is ○ if the number of samples with creation of a white stain is zero (no white stain in any one of the samples), the result is Δ if the number of samples is one to four, and the result is x if the number of samples is five (white stain in all of the samples). A white stain is aggregation of small bright points that are created by leaking of light and may be caused by leaking of a sealing material component. As illustrated in Table 1, it was found that the thermal shock properties are low in Comparative Example 1 in which the thermosetting sealing material was used and the vacuum injection method was performed.

On the other hand, in Example 1 and Example 2 in which the panels were produced with the hybrid method while the sealing material 13 that includes both of the ultraviolet curable component and the thermosetting component being used, good results were obtained in all of the evaluation items.

The same evaluations as above were checked for thirty panels of five rows and six columns each of which is a 7.03 type in-vehicle model, and similar evaluation results were obtained.

Other Embodiments

The present technology is not limited to the embodiments described in the above descriptions and drawings. The following embodiments may be included in the technical scope.

(1) In the above embodiments, the sealing material is applied on the CF substrate but may be applied on the array substrate.

(2) In the above embodiments, the liquid crystal display panel 11 that operates in the FFS mode is described; however, the liquid crystal display panel is not necessarily the one that operates in the FFS mode but the one that may operate in the IPS mode or may include electrodes on both substrates.

(3) In the second embodiment, the projection 47 is cut at the distal end thereof in the cutting step and thereafter, the second cutting is performed to remove the residual sealing material that remains on the opposite side from the opening. However, the substrate is first cut into multiple panels ouch that the projections 47 remain and openings may be formed by second cutting.

The invention claimed is:

1. A method of producing liquid crystal display panels, the method comprising:
a sealing material application step of applying sealing material including both of an ultraviolet curable component and a thermosetting component on a first substrate to define regions;
a vacuum assembling step of assembling a second substrate to the first substrate via the sealing material in a vacuum;
an atmospheric pressure pressing step of pressing the first substrate and the second substrate that are assembled to each other under atmospheric pressure;
an ultraviolet curing step of irradiating ultraviolet rays to the sealing material to perform ultraviolet curing;
a thermal curing step of heating the sealing material to perform thermal curing;
a cutting step of cutting the first substrate and the second substrate that are assembled to each other into pieces for each of the regions that are defined by the sealing material and forming pairs of substrates each of which including the region that is surrounded by the sealing material; and
a liquid crystal injecting step of injecting liquid crystals into a space between each of the pairs of substrates, wherein
in the sealing material application step, the sealing material that defines the regions where liquid crystals are to be injected is applied in a closed loop form.

2. The method of producing liquid crystal display panels according to claim 1, wherein the sealing material that is applied in the closed loop form is opened at a portion thereof and an opening is formed in the cutting step and the liquid crystals are injected through the opening.

3. The method of producing liquid crystal display panels according to claim 2, wherein the sealing material is applied in a loop form such that adjacent pair of substrates are connected to each other via a connection section in the sealing material application step, and the connection section is cut to form the opening in the cutting step.

4. A method of producing liquid crystal display panels, the method comprising:
a sealing material application step of applying sealing material including both of an ultraviolet curable component and a thermosetting component on a first substrate to define regions;
a vacuum assembling step of assembling a second substrate to the first substrate via the sealing material in a vacuum;
an atmospheric pressure pressing step of pressing the first substrate and the second substrate that are assembled to each other under atmospheric pressure;
an ultraviolet curing step of irradiating ultraviolet rays to the sealing material to perform ultraviolet curing;

a thermal curing step of heating the sealing material to perform thermal curing;

a cutting step of cutting the first substrate and the second substrate that are assembled to each other into pieces for each of the regions that are defined by the sealing material and forming pairs of substrates each of which including the region that is surrounded by the sealing material; and a liquid crystal injecting step of injecting liquid crystals into a space between each of the pairs of substrates, wherein in the sealing material application step, the sealing material that defines the regions is applied in a closed loop form, the sealing material that is applied in the closed loop form is opened at a portion thereof and an opening is formed in the cutting step and the liquid crystals are injected through the opening.

\* \* \* \* \*